(12) United States Patent
Rue

(10) Patent No.: US 7,433,309 B2
(45) Date of Patent: Oct. 7, 2008

(54) APPARATUS FOR CONTROLLING LOAD BALANCE OF MULTI-ACCESS POINTS IN WIRELESS LAN SYSTEM AND METHOD THEREOF

(75) Inventor: Seon-soo Rue, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 854 days.

(21) Appl. No.: 10/721,173

(22) Filed: Nov. 26, 2003

(65) Prior Publication Data

US 2004/0105416 A1 Jun. 3, 2004

(30) Foreign Application Priority Data

Dec. 2, 2002 (KR) .................. 10-2002-0076052

(51) Int. Cl.
*H04L 1/00* (2006.01)

(52) U.S. Cl. .................. 370/232; 370/235; 370/328

(58) Field of Classification Search ............... 370/230, 370/232, 235, 236, 236.1, 236.2; 455/453
See application file for complete search history.

(56) References Cited

U.S. PATENT DOCUMENTS

| | | | |
|---|---|---|---|
| 5,448,569 A | 9/1995 | Huang et al. | |
| 5,764,634 A | 6/1998 | Christensen et al. | |
| 5,852,630 A * | 12/1998 | Langberg et al. | 375/219 |
| 5,894,472 A * | 4/1999 | de Seze | 370/337 |
| 6,144,855 A * | 11/2000 | Slovin | 455/432.1 |
| 6,282,187 B1 | 8/2001 | Evans et al. | |
| 6,338,131 B1 * | 1/2002 | Dillon | 712/201 |
| 6,469,991 B1 | 10/2002 | Chuah | |
| 6,732,184 B1 | 5/2004 | Merchant et al. | |
| 2001/0012778 A1 * | 8/2001 | Eriksson et al. | 455/436 |
| 2001/0021650 A1 * | 9/2001 | Bilgic | 455/418 |
| 2001/0055285 A1 * | 12/2001 | Tomoike | 370/328 |
| 2002/0001467 A1 | 1/2002 | Tanaka et al. | |
| 2002/0022487 A1 * | 2/2002 | Ahn | 455/453 |
| 2002/0052206 A1 * | 5/2002 | Longoni | 455/453 |
| 2002/0110105 A1 * | 8/2002 | Awater et al. | 370/338 |
| 2002/0128907 A1 | 9/2002 | Sato et al. | |
| 2002/0176396 A1 | 11/2002 | Hammel et al. | |
| 2003/0133420 A1 | 7/2003 | Haddad | |
| 2003/0139197 A1 * | 7/2003 | Kostic et al. | 455/525 |

(Continued)

FOREIGN PATENT DOCUMENTS

WO WO 2004/004227 A1 1/2004

*Primary Examiner*—Hassan Kizou
*Assistant Examiner*—Bo Hui A Zhu
(74) *Attorney, Agent, or Firm*—Robert E. Bushnell, Esq.

(57) ABSTRACT

In a wireless LAN system, an apparatus for controlling load balance of multi-access points and a method thereof prevent load from being concentrated on a specific access point by comparatively evaluating received load values of many access points after receiving the load values from the access points, and enabling the access point having the concentrated load to reject terminal access or remove prior-accessed terminals. The apparatus comprises: wireless LAN terminals having wireless LAN interfaces and receiving a wireless LAN service; access points providing the wireless LAN service to the wireless LAN terminals, periodically transmitting load state information, and suppressing an increase of load when a load suppressing signal is received; and a management system comparatively evaluating load states of each access point by receiving the load state information from the access points, and transmitting a load increase suppressing signal to access points under certain conditions.

22 Claims, 6 Drawing Sheets

U.S. PATENT DOCUMENTS

| | | | |
|---|---|---|---|
| 2003/0169713 A1* | 9/2003 | Luo | 370/338 |
| 2003/0179707 A1 | 9/2003 | Bare | |
| 2003/0206532 A1 | 11/2003 | Shpak | |
| 2003/0210672 A1 | 11/2003 | Cromer et al. | |
| 2004/0068668 A1* | 4/2004 | Lor et al. | 713/201 |

* cited by examiner

APPARATUS FOR CONTROLLING LOAD BALANCE OF MULTI-ACCESS POINTS IN WIRELESS LAN SYSTEM AND METHOD THEREOF

CLAIM OF PRIORITY

This application makes reference to, incorporates the same herein, and claims all benefits accruing under 35 U.S.C. § 119 from an application for APPARATUS FOR CONTROLLING THE LOAD BALANCE IN MULTI-ACCESS POINTS AND METHOD THEREOF earlier filed in the Korean Intellectual Property Office on 2 Dec. 2002 and there duly assigned Serial No. 2002-76052.

BACKGROUND OF THE INVENTION

1. Field of the Invention

The present invention generally relates to in multi-access points of a wireless LAN (Local Area Network) system, and more specifically to an apparatus for controlling load balance of multi-access points in a wireless LAN system and a method thereof for preventing load from being concentrated on a specific access point by comparatively evaluating load values of many access points after receiving the load values of the access points, and rejecting terminal access or removing existing accessed terminals in an access point where load is concentrated.

2. Description of the Related Art

Generally, widely-used information terminals such as PCs (Personal Computers) or notebooks, PDAs (Personal Digital Assistants) configure a network named LAN (Local Area Network) to reciprocally share information. The LAN is divided into a wired LAN configured by directly connecting the information terminals with the use of communication cables and a wireless LAN configured in wireless communication way using access points.

The wireless LAN is free to move by transceiving data in the wireless communication way with the use of RF (Radio Frequency) or light, as well as easy to expand and maintain. In addition, it supplies a 10/100 BASE-T Ethernet interface function of IEEE (Institute of Electrical and Electronics Engineers) 802.3 as a wired processor, and secures a 2 Mbps (megabits per second) transmission rate in a 2.4 GHz (gigahertz) frequency band of IEEE 802.11 as a wireless processor.

A wireless LAN system configures a network including: a wireless LAN terminal, an information terminal used by a wireless LAN user; a router and a hub for Internet access; an authenticating server providing an Internet access service; and an access point located between the wireless LAN terminal and the hub relays wireless LAN communication of the corresponding wireless LAN terminal by transmitting an Internet access request to the authenticating server.

Here, the access point is a wireless LAN access equipment supporting interworking between an existing wired LAN service area and a wireless LAN service area, and includes more than one Ethernet MAC (Media Access Control) and wireless LAN MAC. According to a definition of the wireless LAN MAC in the IEEE 802.11, the access point passes through authentication and association processes in order to manage a self wireless LAN service area.

In other words, while requesting Internet access of the wireless LAN terminal, the existing access point performs a wireless LAN relaying function to access the Internet by requesting access authentication of the authenticating server after receiving Internet access information, that is, IP (Internet protocol), gateway, and DNS (Domain Name Server) information preset in the wireless LAN terminal from the corresponding wireless LAN terminal.

At this time, the wireless LAN terminal is authenticated from the authenticating server to access the Internet by inputting a self registered member ID (Identifier) and a password. If the authenticating server permits the Internet access, the corresponding wireless LAN terminal configures a wireless network by having access to the Internet through the access point, the hub, and the router, and transceives data over the Internet. If the authenticating server rejects the Internet access, the Internet access is prohibited.

In the meantime, in order to carry out a roaming process (here, this means communication connection switching is performed from one access point to other access point) to another access point from one access point, the wireless LAN terminal executes an operation (scanning) of finding out an access point in which the wireless LAN terminal can register, after transmitting a probe request frame and receiving a probe response frame.

Common scans include two types of scans, that is, an active mode scan and a passive mode scan in a default state. First, the active mode scan is performed, and if the access point is not found within a BSS (Basic Service Set), a scanning mode is switched into the passive mode scan to perform the passive mode scan. If the access point is not still found, the active mode scan and the passive mode scan are repeated.

In the above operation (scanning operation), all channels should be scanned to find out an accessible access point. The roaming process is carried out when the wireless LAN terminal transmits an authentication request frame (requesting the wireless LAN terminal to register in the access point (IEEE802.11)) to an initially-accessed access point based on the scans and receives an authentication response frame authenticating the wireless LAN terminal from the access point.

However, according to the above roaming system, the wireless LAN terminal is separated from a current access point, scans all accessible access points, and performs a registration procedure in an access point having a maximum RSSI (Receive Signal Structure Indicator).

Meanwhile, according to an earlier art in which the wireless LAN terminal attempts to access the access point and maintains the access by using an RSSI in a wireless LAN, there is a problem that load is concentrated on several access points while using multi-access points.

In a wireless LAN environment having multi-access points, the wireless LAN terminals are concentrated on an access point by being located in the access point. On the contrary, there occurs an unequal situation, for instance, an access point does not have any wireless LAN terminals.

Thus, the wireless LAN terminals of the wireless LAN try to access a near access point. In case the access point permits the access of the terminals, if signal strength of the access point satisfies a threshold value determined in the wireless LAN terminals although load is concentrated on the access point, the wireless LAN terminals continuously maintain data communication through the access point having much load even though other access point is in an idle state. As a result, the wireless LAN operating the multi-access points is inefficiently performed and the access point having the concentrated load causes delay and error problems.

SUMMARY OF THE INVENTION

It is therefore an object of the present invention to provide an apparatus for controlling load balance of multi-access points in a wireless LAN system and a method thereof for preventing data traffic load from being concentrated in the wireless LAN using the multi-access points.

In addition, it is another object of the present invention to provide an apparatus for controlling load balance of multi-access points in a wireless LAN system and a method thereof for reducing entire error rates of the wireless LAN by preventing data traffic load from being concentrated on a specific access point in the wireless LAN.

Also, it is another object of the present invention to provide an apparatus for controlling load balance of multi-access points in a wireless LAN system and a method thereof for satisfying quick processing requests of wireless LAN terminals by preventing data traffic load from being concentrated on a specific access point in the wireless LAN.

To achieve the above and other objects, there is provided an apparatus for controlling load balance of multi-access points in a wireless LAN system, the apparatus includes: many wireless LAN terminals having wireless LAN interfaces and receiving a wireless LAN service; many access points providing the wireless LAN service to the wireless LAN terminals, periodically transmitting load state information, and suppressing an increase of load when a load suppressing signal is received; and a management system comparatively evaluating load states of each access point by receiving the load state information from the access points, and transmitting a load increase suppressing signal to access points whose load values are more than a threshold value, if there are the access points whose load values are more than the threshold value and other access points around the access points whose load values are more than the threshold value are in idle state.

On the other hand, to achieve the object, there is provided a method of controlling load balance of multi-access points in a wireless LAN system including many wireless LAN terminals and many access points, the method including: a first step of periodically monitoring load states of the access points; a second step of transmitting a load increase suppressing signal to an access point whose load value exceeds a threshold value, if there is the access point whose load value exceeds the threshold value and there is another idle access point around the access point, while monitoring the load states of the access points; and, a third step of suppressing an increase of load in the corresponding access point according to the transmitted load increase suppressing signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
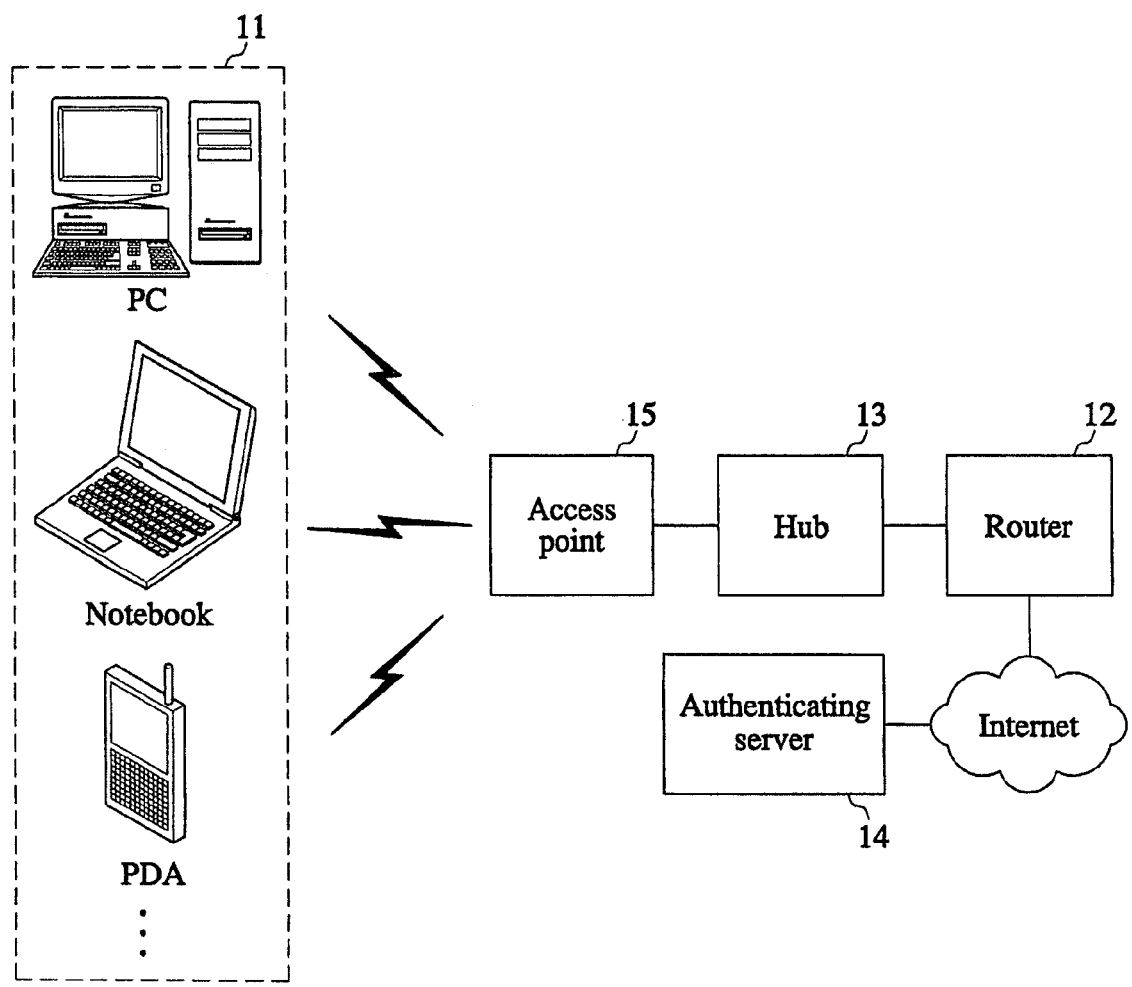
FIG. 1 is a diagram illustrating a configuration of a wireless LAN system in accordance with earlier art.

FIG. 1 is a diagram illustrating a configuration of a wireless LAN system in accordance with earlier art.

As illustrated in FIG. 1, the wireless LAN system configures a network including: a wireless LAN terminal (11), an information terminal used by a wireless LAN user; a router (12) and a hub (13) for Internet access; an authenticating server (14) providing an Internet access service; and an access point (15) located between the wireless LAN terminal (11) and the hub (13) relays wireless LAN communication of the corresponding wireless LAN terminal (11) by transmitting an Internet access request to the authenticating server (14).

Here, the access point (15) is a wireless LAN access equipment supporting interworking between an existing wired LAN service area and a wireless LAN service area, and includes more than one Ethernet MAC (Media Access Control) and wireless LAN MAC. According to a definition of the wireless LAN MAC in the IEEE 802.11, the access point (15) passes through authentication and association processes in order to manage a self wireless LAN service area.

In other words, while requesting Internet access of the wireless LAN terminal (11), the existing access point (15) performs a wireless LAN relaying function to access the Internet by requesting access authentication of the authenticating server (14) after receiving Internet access information, that is, IP (Internet protocol), gateway, and DNS (Domain Name Server) information preset in the wireless LAN terminal (11) from the corresponding wireless LAN terminal (11).

At this time, the wireless LAN terminal (11) is authenticated from the authenticating server (14) to access the Internet by inputting a self registered member ID (Identifier) and a password. If the authenticating server (14) permits the Internet access, the corresponding wireless LAN terminal (11) configures a wireless network by having access to the Internet through the access point (15), the hub (13), and the router (12), and transceives data over the Internet. If the authenticating server (14) rejects the Internet access, the Internet access is prohibited.

In the meantime, in order to carry out a roaming process (here, this means communication connection switching is performed from one access point to other access point) to another access point from one access point, the wireless LAN terminal executes an operation (scanning) of finding out an access point in which the wireless LAN terminal can register, after transmitting a probe request frame and receiving a probe response frame.

Common scans include two types of scans, that is, an active mode scan and a passive mode scan in a default state. First, the active mode scan is performed, and if the access point is not found within a BSS (Basic Service Set), a scanning mode is switched into the passive mode scan to perform the passive mode scan. If the access point is not still found, the active mode scan and the passive mode scan are repeated.

In the above operation (scanning operation), all channels should be scanned to find out an accessible access point. The roaming process is carried out when the wireless LAN terminal transmits an authentication request frame (requesting the wireless LAN terminal to register in the access point (IEEE802.11)) to an initially-accessed access point based on the scans and receives an authentication response frame authenticating the wireless LAN terminal (11) from the access point.

However, according to the above roaming system, the wireless LAN terminal is separated from a current access point, scans all accessible access points, and performs a registration procedure in an access point having a maximum RSSI (Receive Signal Structure Indicator).

Meanwhile, according to an earlier art in which the wireless LAN terminal attempts to access the access point and maintains the access by using an RSSI in a wireless LAN, there is a problem that load is concentrated on several access points while using multi-access points.

Figure 2:
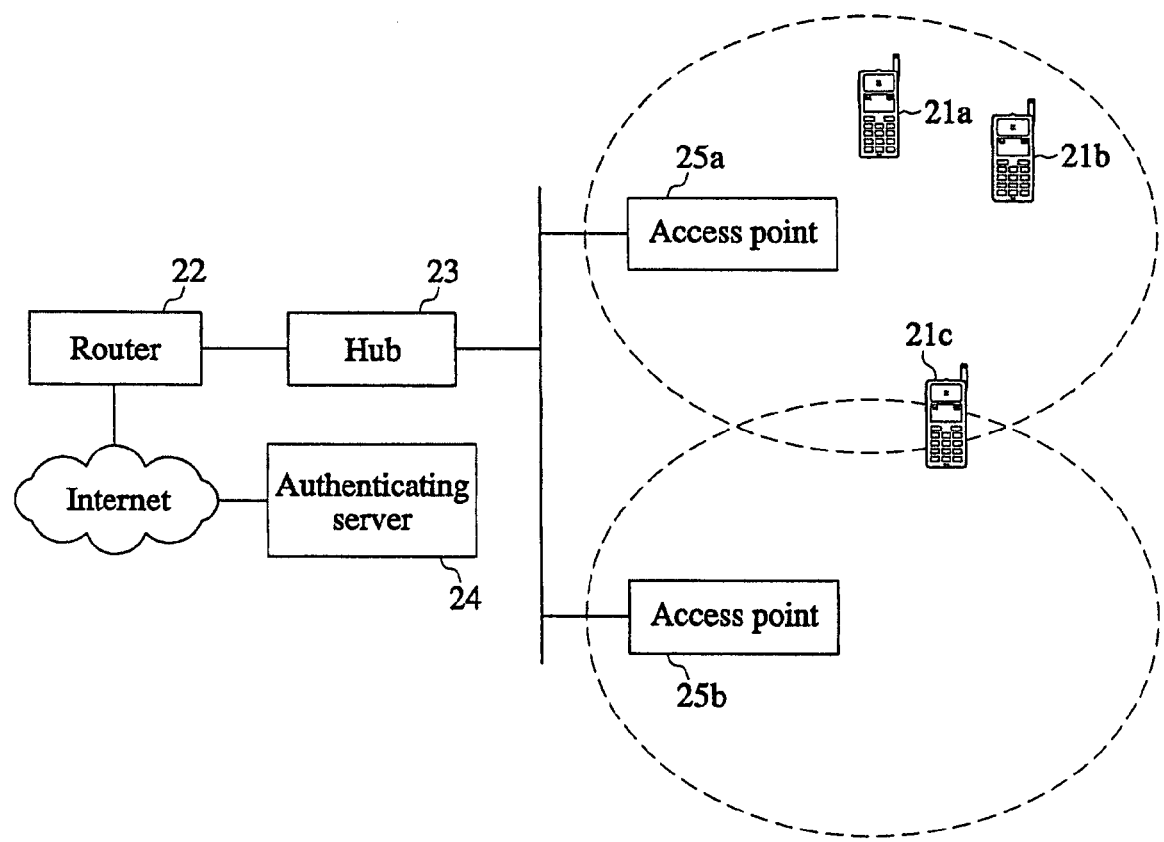
FIG. 2 is a diagram illustrating a format diagram of a wireless LAN system having multi-access points in accordance with earlier art.

FIG. 2 is a diagram illustrating a wireless LAN environment having multi-access points in accordance with earlier art.

As illustrated in FIG. 2, wireless LAN terminals (21a~21c) are concentrated on an access point (25a) by being located in the access point (25a). On the contrary, there occurs an unequal situation, for instance, an access point (25b) does not have any wireless LAN terminals.

Thus, the wireless LAN terminals of the wireless LAN try to access a near access point. In case the access point permits the access of the wireless LAN terminals, if signal strength of the access point satisfies a threshold value determined in the wireless LAN terminals although load is concentrated on the access point, the wireless LAN terminals continuously maintain data communication through the access point having much load even though other access point is in an idle state. As a result, the wireless LAN operating the multi-access points is inefficiently performed and the access point having the concentrated load causes delay and error problems.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and areas are exaggerated for clarity. It will also be understood that when a layer is referred to as being "on" another layer or substrate, it can be directly on the other layer or substrate or intervention layers may be also be present. Moreover, each embodiment described and illustrated herein includes its complementary conductivity type embodiment as well.

The following detailed description will present invention apparatus for controlling load balance of multi-access points in wireless LAN system and method thereof according to a preferred embodiment of the invention in reference to the accompanying drawings.

Figure 3:
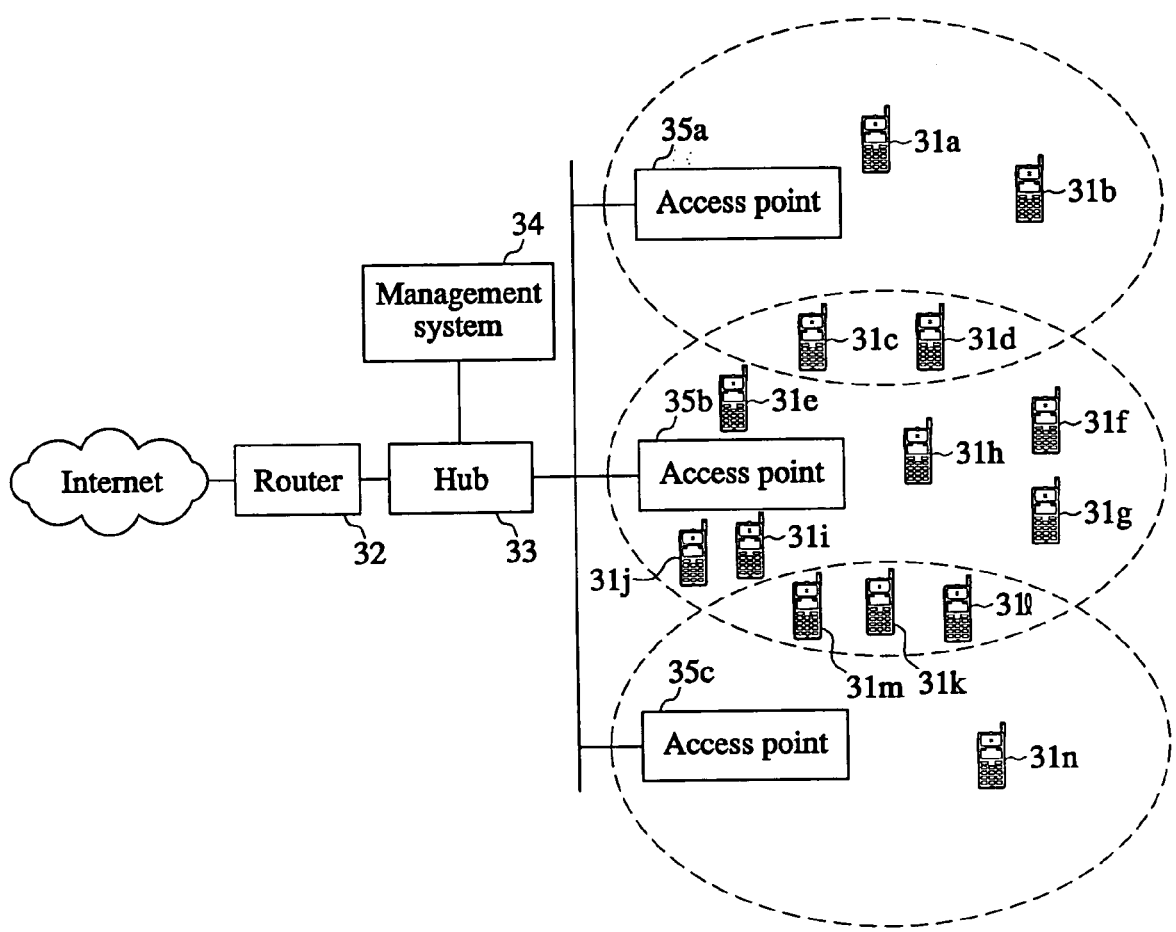
FIG. 3 is a diagram illustrating an apparatus for controlling load balance of multi-access points in a wireless LAN system in accordance with one embodiment of the present invention.

FIG. 3 is a diagram illustrating an apparatus for controlling load balance of multi-access points in a wireless LAN system in accordance with one embodiment of the present invention.

As illustrated in FIG. 3, a load balance controlling system of the multi-access points in the wireless LAN system includes many wireless LAN terminals (31a~31n), a router (32), a hub (33), a management system (34), and many access points (35a, 35b, 35c).

The management system (34) manages the access points (35a, 35b, 35c), assigns and changes channels for each access point (35a, 35b, 35c), assigns IPs in accordance with DHCP (dynamic host configuration protocol), and monitors operation states of each access point (35a, 35b, 35c).

Also, the management system (34) controls the assigned channels of each access point (35a, 35b, 35c) by recognizing present conditions of the wireless LAN terminals (31a~31n) connected to the access points (35a, 35b, 35c).

Moreover, the management system (34) performs data path switching by managing information on the access points (35a, 35b, 35c), and stores data on positions of each access point (35a, 35b, 35c).

Furthermore, the management system (34) receives the number of the accessed wireless LAN terminals (31a~31n), information and the number of the wireless LAN terminals (31a~31n) recently transmitting data frames after the access, the number of the data frames, and data frame length from the access points (35a, 35b, 35c).

Then, the management system (34) comparatively evaluates load states of each access point (35a, 35b, 35c) based on information related to various kinds of load transmitted from each access point (35a, 35b, 35c). If the load of the specific access points (35a, 35b, 35c) exceeds a threshold value, the management system controls not to generate new load in the corresponding access points (35a, 35b, 35c).

Such controlling operation can be performed by two functions. One is to transmit an authentication failure response message when the wireless LAN terminals (31a~31n) request a permission to access, without adding the wireless LAN terminals (31a~31n) newly attempting the access to a BSS table.

On this occasion, the management system (34) can induce the wireless LAN terminals (31a~31n) to access the accessible access points (35a, 35b, 35c) in the idle state by transmitting information on the neighboring accessible access points (35a, 35b, 35c) in idle state.

Also, the management system (34) makes the wireless LAN terminals attempt to access the access points (35a, 35b, 35c) by transmitting information of the wireless LAN terminals to the neighboring accessible access points (35a, 35b, 35c) in idle state, thereby enabling the wireless LAN terminals attempting to access the access points (35a, 35b, 35c) whose load values exceed the threshold value to access the neighboring access points (35a, 35b, 35c).

The other controlling function is as follows. When the wireless LAN terminals (31a~31n), which do not continuously generate data traffic though being connected to the access points (35a, 35b, 35c), generate data traffic while the load values exceed the threshold value, the BSS table deletes network node addresses of the wireless LAN terminals (31a~31n) generating the new data traffic, so as to stop a data service provided to the wireless LAN terminals (31a~31n).

At this time, in the same way, the management system (34) can induce the wireless LAN terminals (31a~31n) to access the accessible access points (35a, 35b, 35c) in the idle state by transmitting information on the neighboring accessible access points (35a, 35b, 35c) in the idle state. The management system (34) also makes the wireless LAN terminals access the access points (35a, 35b, 35c) by transmitting information on the wireless LAN terminals to the neighboring accessible access points (35a, 35b, 35c) in the idle state, thereby enabling the wireless LAN terminals attempting to access the access points (35a, 35b, 35c) whose load values exceed the threshold value to access the neighboring access points (35a, 35b, 35c).

Thus, in order that the management system (34) performs load balancing, it should overall grasp positions of the access points (35a, 35b, 35c), and there should be the access points (35a, 35b, 35c) in idle state around the access points (35a, 35b, 35c) whose load values reach the threshold value. If there are no access points (35a, 35b, 35c) in idle state, rather much load will be created while finding out the idle access points (35a, 35b, 35c).

On the other hand, the access points (35a, 35b, 35c) are internetworking devices for connecting a wireless LAN to a wired LAN, retransmit overheard wireless LAN network data oriented toward a wired node to the wired LAN, and retransmit wired LAN network data oriented toward the wireless LAN terminals (31a~31n) to the wireless LAN. Here, an internetworking service includes retransmission of a message to a wired LAN node from the wireless LAN terminals (31a~31n), and retransmission of the message to the wireless LAN terminals (31a~31n) from the wired LAN node.

The access points (35a, 35b, 35c) may have limited valid ranges according to wireless media, require many devices having overlapping areas to some extent in order to provide a proper coverage area, and cause that messages are repeatedly received by wireless LAN terminals (31c, 31d, 31k, 31l, 31m) within the overlapping areas and messages generated from such wireless LAN terminals (31c, 31d, 31k, 31l, 31m) are repeatedly received on the wired LAN.

In order that the wireless LAN terminals (31a~31n) are within the access points (35a,35b, 35c), the wireless LAN terminals (31a~31n) should belong to a physical area called a BSA (Basic Service Area) of the access points (35a, 35b, 35c). If the wireless LAN terminals (31a~31n) are within the basic service area of the specific access points (35a, 35b, 35c), the wireless LAN terminals (31a~31n) may receive signals transmitted by the specific access points (35a, 35b, 35c).

Also, the access points (35a, 35b, 35c) physically connected to the wired LAN are connected to power, and transmitters used in the access points (35a, 35b, 35c) may have stronger outputs than battery outputs of transmitters used in the wireless LAN terminals (31a~31n).

The access points (35a,35b,35c) transmit self information to each wireless LAN terminal (31a~31n) in beacon type identifying self network addresses at regular intervals, and each wireless LAN terminal (31a~31n) can decide whether to be in a basic service area of which access points (35a, 35b, 35c) by regular data transmissions or beacons of the access points (35a, 35b, 35c).

Each access point (35a, 35b, 35c) maintains tables of all the wireless LAN terminals (31a~31n) connected with the access points, called BSS (Basic Service Set) tables.

After successfully receiving access requests from the wireless LAN terminals (31a~31n), the access points (35a, 35b, 35c) add the network node addresses of the wireless LAN terminals (31a~31n) to the self BSS tables.

When it is displayed that the wireless LAN terminals (31a~31n) previously accessed other access points (35a, 35b, 35c) by the access requests, the access points (35a, 35b, 35c) can enable the previous access points (35a, 35b, 35c) to transmit disassociated data packets through the wired LAN. Unlike this, when the wireless LAN terminals (31a~31n) access the new access points (35a, 35b, 35c), the new access points can direct the wireless LAN terminals (31a~31n) to transmit disassociating requests to the previous access points (35a, 35b, 35c).

When receiving the disassociated data packets from the new access points (35a, 35b, 35c), the previous access points (35a, 35b, 35c) delete the network node addresses of the wireless LAN terminals (31a~31n) from the previous self BSS tables.

In addition, when failing to successfully transmit data to the wireless LAN terminals (31a~31n), the access points (35a, 35b, 35c) consider that self wireless access to the wireless LAN terminals (31a~31n) is cut off, and will delete the wireless LAN terminals (31a~31n) from the self BSS tables.

In addition, the access points (35a, 35b, 35c) examine timed data traffic amounts of each wireless LAN terminal (31a~31n) and store them (the timed data traffic amounts of each wireless LAN terminal (31a~31n)), except managing the BSS tables.

Furthermore, the access points (35a, 35b, 35c) report the number of the periodically-accessed wireless LAN terminals (31a~31n), the number of the wireless LAN terminals (31a~31n) recently transmitting data frames after the access, the number of the data frames, and data frame length to the management system (34).

Also, in case a control signal for stopping an operation of a newly generating load, owing to the load of the management system (34) exceeding a threshold value, is received in response to a report on periodical load states, the access points (35a, 35b, 35c) transmit an authentication failure response message during authentication if the new wireless LAN terminals (31a~31n) access the access points (35a, 35b, 35c), thereby enabling the wireless LAN terminals (31a~31n) to continuously keep having access to the previous access points (35a, 35b, 35c) or to set access with the idle access points (35a, 35b, 35c) located in a mobile direction.

If the wireless LAN terminals (31a~31n), which do not continuously generate data traffic and keep accessing according to a control signal of the management system (34), generate new data traffic, the BSS tables delete the corresponding wireless LAN terminals (31a~31n) to stop the access.

By doing this, the corresponding access points (35a, 35b, 35c) induce the wireless LAN terminals (31a~31n) to newly find out the neighboring access points (35a, 35b, 35c) in the idle state, and control load balancing of the overall wireless LAN system.

Meanwhile, the wireless LAN terminals (31a~31n) receive a wireless LAN service by mounting predetermined wireless LAN cards on information terminals such as notebooks having communication ports like PCMCIA (Personal Computer Memory Card International Association) port and USB (Universal Serial Bus) port or PCI (Peripheral Component Interconnection) slot or EISA (Extended Industry Standard Architecture) slot, PCs, or PDAs.

For instance, each wireless LAN card of the wireless LAN terminals (31a~31n) includes: an RF (radio frequency) unit for receiving an RF signal from an antenna for receiving the RF signal, and for transmitting data transmitted to the access points (35a, 35b, 35c) as a high frequency signal, an RF signal; a base band processor for modulating the data transmitted to the access points (35a, 35b, 35c) by the RF unit; and an MAC processor performing a data link through an MAC (Medium (or Media) Access Protocol). The RF unit includes: an amplifier for amplifying the RF signal; an RF/IF (radio frequency to intermediate frequency) converter coupled with an oscillator and performing signal conversion between the RF signal and an IF signal; and an IF/BB (intermediate frequency to base band) converter connected between the RF/IF converter and the base band processor, and performing signal conversion between the IF signal and a BB (Base Band) signal.

The wireless LAN terminals (31a~31n) receiving the wireless LAN service request to have access to the access points (35a, 35b, 35c) by transmitting a wireless signal including kinds of security functions showing self encoding methods according to wireless LAN standards such as IEEE 802.11.

The wireless LAN terminals (31a~31n) track the overheard access points (35a, 35b, 35c), and maintain/manage information on the recently overheard access points (35a, 35b, 35c) in access point tables.

When overhearing data packets from the access points (35a, 35b, 35c), the wireless LAN terminals (31a~31n) can attempt access to the access points (35a, 35b, 35c) by transmitting access requests to the access points (35a, 35b, 35c).

If failing to transmit the access requests to the specific access points (35a, 35b, 35c), the wireless LAN terminals (31a~31n) attempt access to other access points existing in the access tables.

If the wireless LAN terminals (31a~31n) overhear more than two access points (35a, 35b, 35c) or there are more than two access points (35a, 35b, 35c) in the tables, the wireless LAN terminals (31a~31f) should select one of the access points (35a, 35b, 35c).

Moreover, in case the access to the access points (35a, 35b, 35c) is stopped, the wireless LAN terminals (31a~31n) attempt access to the most recently overheard access points (35a, 35b, 35c) in the access point tables.

In the meantime, when the wireless LAN terminals failing to attempt the access receive information on the neighboring idle access points (35a, 35b, 35c) from the access points (35a, 35b, 35c), they can have access to the idle access points (35a, 35b, 35c) by attempting access to the idle access points (35a, 35b, 35c) based on the received information.

In addition, when receiving access request signals received from the idle access points (35a, 35b, 35c), the wireless LAN terminals can have access to the idle access points (35a, 35b, 35c) by transmitting access response signals.

Hereinafter, an operation of a load balance controlling system applied to the present invention will be more fully described as follows in reference to FIG. 3.

Many access points (35a, 35b, 35c) keep accessing to many wireless LAN terminals (31a~31n), and the access point (35a) located in the highest position keeps accessing to 4 terminals (31a~31d). The access point (35b) located in the middle keeps accessing to 9 wireless LAN terminals (31e~31m), and the access point (35c) located in the lowest position keeps accessing to 1 wireless LAN terminal (31n).

Here, suppose the wireless LAN terminal denoted as number 31b and located in a BSS (Basic Service Set) of the highest access point (35a) does not generate data traffic, and the wireless LAN terminals denoted as numbers 31f, 31k, 31l and located in a BSS of the middle access point (35b) do not generate data traffic.

Also, suppose the wireless LAN terminal denoted as number 31c and located in the basic service set of the highest access point (35a) moves to a basic service set area of the lowest access point (35c) from the highest access point (35a).

Under this circumference, the highest access point (35a) has 4 wireless LAN terminals currently accessed to the self, has 3 wireless LAN terminals generating data traffic, and transmits load state information such as the number of data frames and data frame length to a management system (34).

In addition, the middle access point (35b) has 9 wireless LAN terminals currently accessed to the self, has 3 wireless LAN terminals generating data traffic, and transmits load state information such as the number of data frames and data frame length to the management system (34).

The lowest access point (35c) has 1 wireless LAN terminal currently accessed to the self, has 1 wireless LAN terminal generating data traffic, and transmits load state information such as the number of data frames and data frame length to the management system (34).

Then, the management system (34) observes a load state of the middle access point (35b). If a load value of the access point (35b) located in the middle is more than a regular value because the wireless LAN terminal denoted as number 31c moves or the wireless LAN terminals (31k, 31l, 31m) that do not continuously generate the data traffic generate the data traffic, the management system (34) transmits a control signal for removing load causing factors to the middle access point (35b). At this point, the management system (34) should firstly decide whether the access points (35a, 35c) around the middle access point (35b) are in idle state. If in the idle state, the management system (34) transmits the control signal for removing the load causing factors to the middle access point (35b).

Such control signal can stop the access by transmitting an authentication failure message while authenticating the wireless LAN terminal denoted as number 31c moving from the highest access point (35a), or by deleting network node addresses of the wireless LAN terminals denoted as numbers 31k, 31l, 31m generating new data traffic from BSS tables.

Meanwhile, when failing to have access to the new middle access point (35b) though an access request message is transmitted, the wireless LAN terminal denoted as number 31c keeps accessing to the highest access point (35a).

In addition, the wireless LAN terminals denoted as numbers 31k, 31l, 31m delete the middle access point (35b) accessed in access point tables, and attempt access to the previously-accessed lowest access point (35c) by transmitting access request messages to the access point (35c).

At this time, the management system (34) provides information on the highest access point (35a) to the wireless LAN terminal denoted as number 31c attempting the access through the middle access point (35b) whose load is more than a threshold value, and keeps accessing to the highest access point (35a).

Also, the management system (34) transmits information on the lowest idle access point (35c) to the wireless LAN terminals denoted as numbers 31k, 31l, 31m generating new traffic through the middle access point (35b) having load, and attempts access to the lowest access point (35c), thereby accessing the access point (35c).

On this occasion, the management system can keep accessing by transmitting information on the wireless LAN terminal denoted as number 31c to the highest access point (35a) in the idle state, and attempting the access by transmitting information on the wireless LAN terminals denoted as numbers 31k, 31l, 31m generating new data traffic to the lowest access point (35c).

Figure 4:
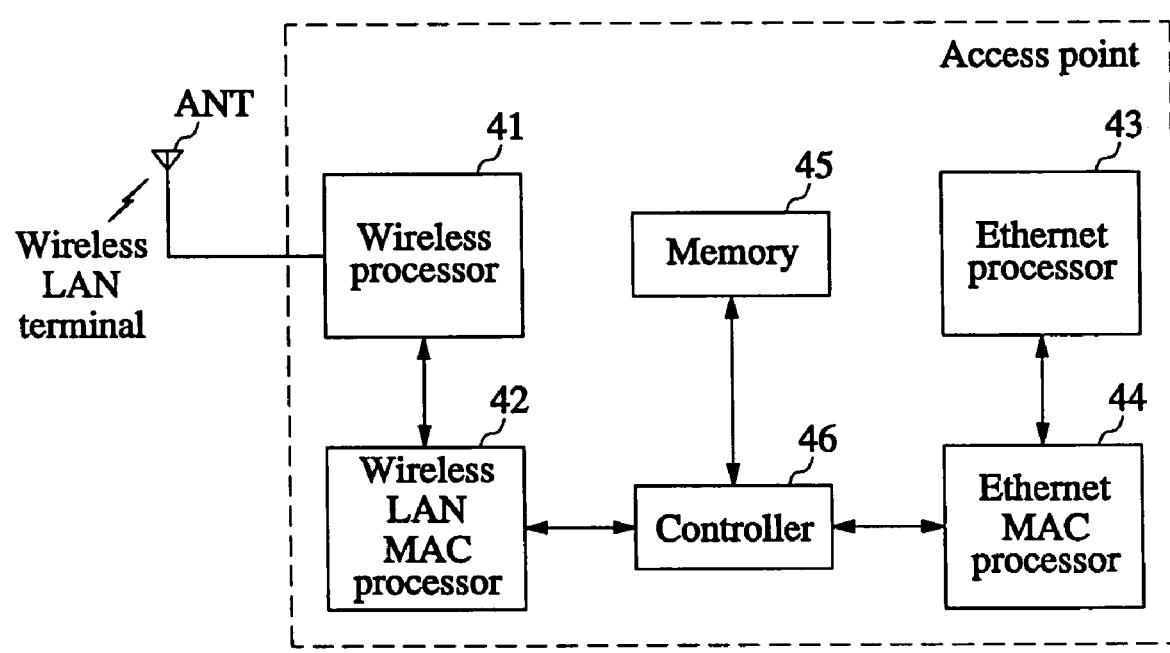
FIG. 4 is a diagram illustrating a detailed block configuration of an access points of FIG. 3.

FIG. 4 is a diagram illustrating a detailed block configuration of an access point of FIG. 3.

As illustrated in FIG. 4, the access point of FIG. 3 includes a wireless processor (41), a wireless LAN MAC processor (42), an Ethernet processor (43), an Ethernet MAC processor (44), a memory (45), and a controller (46).

The wireless processor (41) is composed of an amplifier, an oscillator, a transceiving switch, an RF/IF converter, an IF/BB converter, a base band processor, and a modem, and transceives a wireless signal for a wireless LAN service. The wireless LAN MAC processor (42) controls inputting/outputting of wireless LAN data through a wireless LAN MAC protocol.

The Ethernet processor (43) directly transceives an Ethernet signal for a wired LAN service, and the Ethernet MAC processor (44) controls inputting/outputting of wired LAN data through an Ethernet MAC protocol.

The memory (45) composed of an RAM (Random Access Memory) and a flash memory reports operation firmware of access points, a wireless LAN operation routine displaying an operation performed by the controller (46) in mechanical language type, wireless LAN operation information which is data inputted/outputted through wireless LAN terminals or networks or generated while driving the wireless LAN operation routine, and load state information such as the number of wireless LAN terminals currently keeping accessing by receiving a call of the wireless LAN operation routine, the number of wireless LAN terminals recently generating traffic, the number of data frames, and data frame length to a management system, and stores a load balance controlling routine for suppressing generation of new load under control of the management system. The controller (46) controls a wireless LAN operation for performing overall functions of the access points, and controls accessing and inputting/outputting of the memory (45).

Hereinafter, an operation of the access point applied by the present invention will be more fully described as follows in reference to FIG. 4.

The controller (46) controls the wireless LAN operation for performing overall functions, and particularly, drives the load balance controlling routine, thus the controller reads load state information such as the number of the accessed wireless LAN terminals, the number of the wireless LAN terminals recently generating the traffic, the number of the data frames, and the data frame length stored in the memory (45), and transmits the read information to the management system through the Ethernet MAC processor (44) and the Ethernet processor (43).

Moreover, when the control signal for suppressing a further increase of load is received from the management system through the Ethernet processor (43) and the Ethernet MAC processor (44), the controller (46) intercepts access during an access step by transmitting an authentication failure message while authenticating the wireless LAN terminals accessed through the wireless LAN MAC processor (42) and the wireless processor (41).

Also, the controller (46) receives network node addresses of wireless LAN terminals that do not recently transmit data traffic among the wireless LAN terminals accessed from the memory (45), and deletes the received network node addresses of the wireless LAN terminals in BSS tables. Thus, the controller controls to stop the access when the wireless LAN terminals that do not generate the data traffic newly generate the data traffic.

On the other hand, the controller (46) receives information on idle access points from the management system through the Ethernet processor (43) and the Ethernet MAC processor (44), and can induce access-rejected wireless LAN terminals to access the neighboring idle access points by transmitting the information to the access-rejected wireless LAN terminals.

Also, when receiving information on wireless LAN terminals attempting to access other access point having much load from the management system through the Ethernet processor (43) and the Ethernet MAC processor (44), the controller (46) of the idle access points transmits access request messages to the corresponding wireless LAN terminals and keeps accessing by attempting the access.

Figure 5:
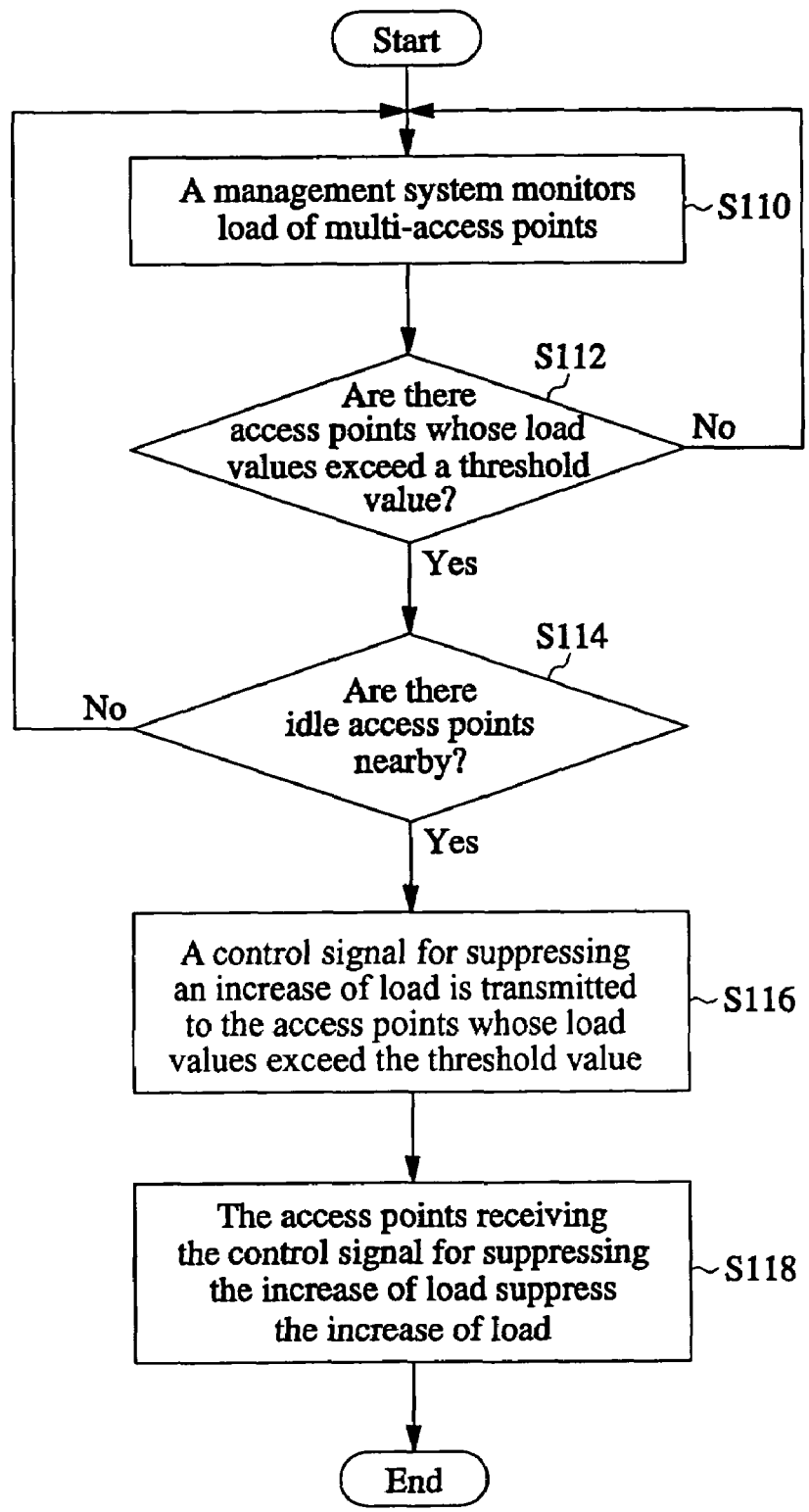
FIG. 5 is a diagram illustrating a method of controlling load balance of multi-access points in a wireless LAN system in accordance with one embodiment of the present invention as a flow chart.

FIG. 5 is a diagram illustrating a method of controlling load balance of multi-access points in a wireless LAN system in accordance with one embodiment of the present invention as a flow chart.

As illustrated in FIG. 5, in the wireless LAN system in accordance with one embodiment of the present invention, the method of controlling load balance in the multi-access points includes the step of monitoring load states of many access points by a management system (S110). When monitoring the load states by the management system, the management system periodically receives load state information from the multi-access points and continuously monitors the received load state information. If a timed changing value is more than a regular value, the management system receives the load state information by requesting when necessary, and monitors the load states of the access points based on the received load state information. Here, though the multi-access points report the load states in response to the request of transmitting the load state information from the management system, it is possible for the multi-access points to periodically transmit the load state information to the management system.

Next, the management system monitoring the load states of the multi-access points decides the load states of each access point based on the load state information received from the multi-access points, and decides whether there are access points whose load values exceed a threshold value (S112).

After deciding whether there are access points whose load values exceed the threshold value, if there are no access points whose load values exceed the threshold value, the management system repeats from the step 'S110'. If there are access points whose load values exceed the -threshold value, the management system decides whether there are idle access points nearby (S114).

After deciding whether there are idle access points nearby, if there are no idle access points nearby, the management system repeats from the step 'S110'. If there are idle access points nearby, the management system transmits a control signal for suppressing an increase of load to the access points whose load values exceed the threshold value (S116).

The access points receiving the control signal for suppressing the increase of load from the management system transmit an authentication response failure message for wireless LAN terminals newly attempting to access, or delete network node addresses of wireless LAN terminals generating new data traffic by BSS tables among accessed wireless LAN terminals, in order to stop the access to the wireless LAN terminals (S118).

Next, the management system can induce the access-attempting wireless LAN terminals to attempt the access by transmitting information on neighboring access points in the idle state through the access points whose load values exceed the threshold value.

Also, the management system transmits information on the wireless LAN terminals to the neighboring access points in idle state in order that the idle access points around the access points whose load values exceed the threshold value can attempt access to the wireless LAN terminals, and enables the neighboring idle access points receiving the information on the wireless LAN terminals to keep accessing by attempting the access to the wireless LAN terminals.

Furthermore, though an access attempting operation between the wireless LAN terminals and the idle access points described above keeps a prior access method, the operation can be used in the same way when attempting access between the neighboring idle access points and the wireless LAN terminals whose access is stopped by generating new traffic while the terminals do not continuously generate data traffic.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 6:
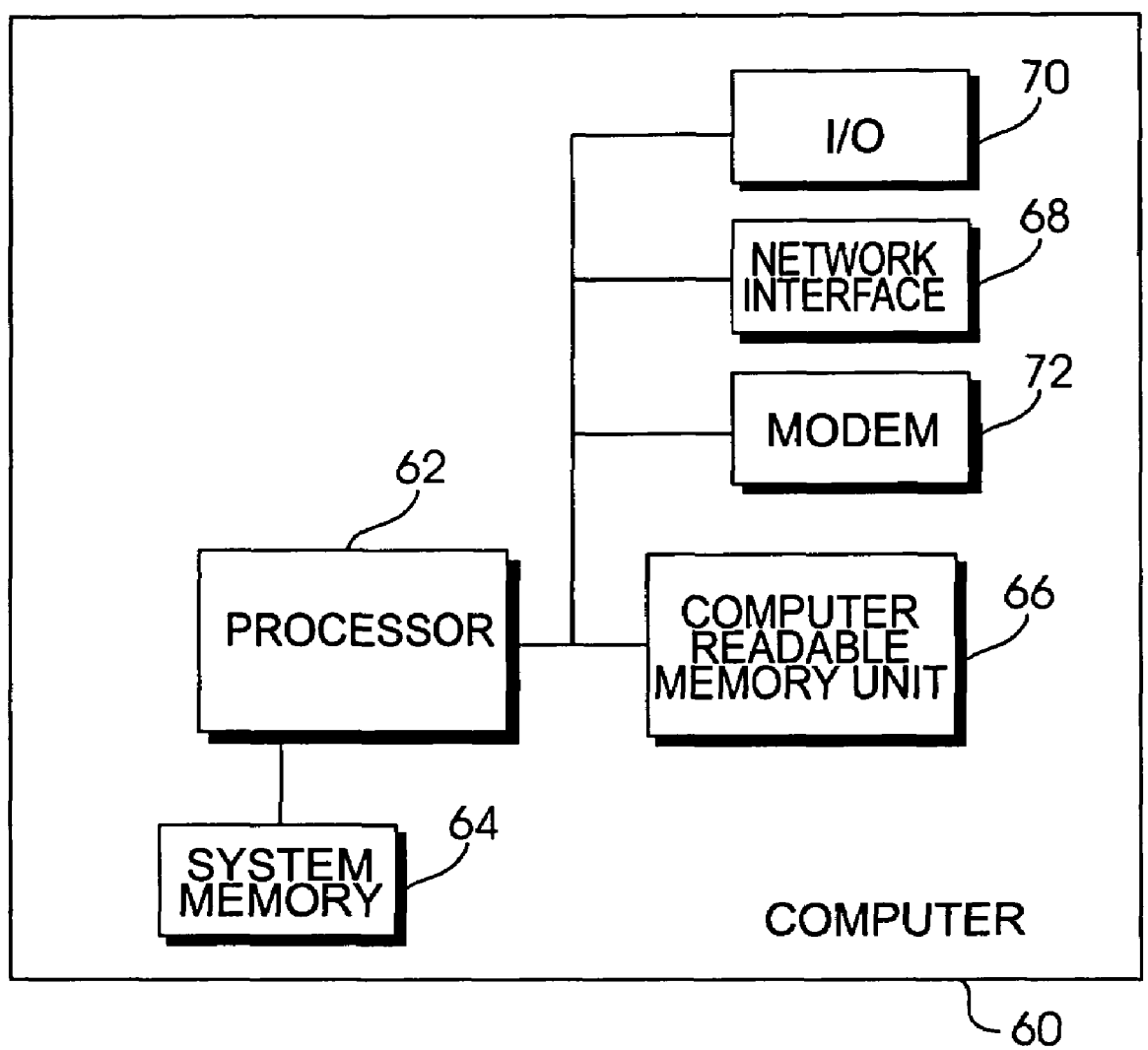
FIG. 6 shows an example of a computer including a computer-readable medium having computer-executable instructions for performing a method of the present invention.

An example of a computer, but not limited to this example of the computer, that can read computer readable media that includes computer-executable instructions of the present invention is shown in FIG. 6. The computer 60 includes a processor 62 that controls the computer 60. The processor 62 uses the system memory 64 and a computer readable memory device 66 that includes certain computer readable recording media. A system bus connects the processor 62 to a network interface 68, modem 72 or other interface that accommodates a connection to another computer or network such as the Internet. The system bus may also include an input and output interface 70 that accommodates connection to a variety of other devices.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

According to the present invention like above, it can prevent traffic from being concentrated in a wireless LAN system using multi-access points.

Also, according to the present invention, it prevents data traffic load from being concentrated, thereby reducing overall error rates of the system.

In addition, according to the present invention, it prevents data traffic load from being concentrated, thereby satisfying quick processing requirements of wireless LAN terminals.

What is claimed is:

1. An apparatus for controlling load balance of multi-access points in a wireless local area network system, the apparatus comprising:
a plurality of wireless local area network terminals having wireless local area network interfaces and receiving a wireless local area network service;
a plurality of access points for providing the wireless local area network service to the wireless local area network terminals, for periodically transmitting load state information, and for suppressing an increase of load when a load suppressing signal is received; and
a management system for comparatively evaluating load states of each access point by receiving the load state information from the access points, and for transmitting a load increase suppressing signal to access points whose load values are more than a threshold value, when there are access points whose load values are more than the threshold value and other access points around the access points whose load values are more than the threshold value are in an idle state;
wherein, when transmitting an authentication failure message according to an authentication request of the wireless local area network terminals,
the management system transmits information on other neighboring access points in the idle state to the access points whose load value exceed the threshold value,
the access points transmit the information on the other neighboring access points in the idle state to the wireless local area network terminals, and
the wireless local area network terminals receive the information on the other neighboring access points in the idle state from the access points and attempt access to the other access points in the idle state.

2. The apparatus of claim 1, wherein the load state information transmitted to the management system from the wireless local area network access points includes a number of accessed wireless local area network terminals, a number of wireless local area network terminals recently generating data traffic, a number of data frames, and a data frame length.

3. The apparatus of claim 1, wherein the load increase suppressing operation, performed by the wireless local area network access points, transmits an authentication failure message according to an authentication request of the wireless local area network terminals attempting the access.

4. The apparatus of claim 1, wherein the load increase suppressing operation, performed by the wireless local area network access points, deletes network node addresses of the wireless local area network terminals by basic service set tables and intercepts the access of the wireless local area network terminals, when the wireless local area network terminals, which do not continuously generate data traffic and keep accessing, generate the data traffic.

5. The apparatus of claim 1, wherein when transmitting the authentication failure message according to the authentication request of the wireless local area network terminals, the management system transmits information on access-attempting wireless local area network terminals to other idle access points, and the idle access points attempt access to the wireless local area network terminals.

6. The apparatus of claim 3, wherein when transmitting the authentication failure message according to the authentication request of the wireless local area network terminals, the management system transmits information on access-attempting wireless local area network terminals to other idle access points, and the idle access points attempt access to the wireless local area network terminals.

7. The apparatus of claim 1, wherein the management system intercepts access of the wireless local area terminals by deleting network node addresses of the wireless local network terminals.

8. The apparatus of claim 4, wherein when intercepting the access of the wireless local area network terminals by deleting the network node addresses of the wireless local area network terminals, the management system transmits information on other neighboring access points in the idle state to the access points whose load values exceed the threshold value, the access points transmit the information on the other neighboring access points in the idle state to the wireless local area network terminals, and the wireless local area network terminals receive the information on other idle access points from the access points and attempt access to other idle access points.

9. The apparatus of claim 7, wherein when intercepting the access of the wireless local area network terminals by deleting the network node addresses of the wireless local area network terminals, the management system transmits information on access-attempting wireless local area network terminals to other idle access points, and the idle access points attempt access to the wireless local area network terminals.

10. The apparatus of claim 4, wherein when intercepting the access of the wireless local area network terminals by deleting the network node addresses of the wireless local area network terminals, the management system transmits information on access-attempting wireless local area network terminals to other idle access points, and the idle access points attempt access to the wireless local area network terminals.

11. A method of controlling load balance of multi-access points in a wireless local area network system including a plurality of wireless local area network terminals and a plurality of access points, the method comprising the steps of:
   periodically monitoring load states of the access points;
   transmitting a load increase suppressing signal to access points whose load values exceed a threshold value when there are the access points whose load values exceed the threshold value, and there are idle access points around the access points while monitoring the load states of the access points; and
   suppressing an increase of load by transmitting an authentication response failure message for access-attempting wireless local area network terminals in corresponding access points according to the transmitted load increase suppressing signal;
   wherein the step of suppressing the increase of load comprises the sub-steps of:
   transmitting information on neighboring idle access points to the access points whose load values exceed the threshold value;
   transmitting the information on the neighboring idle access points to the wireless local area network terminals by the access points; and
   attempting access to the neighboring idle access points, and setting the access by the wireless local area network terminals.

12. The method of claim 11, wherein load state information includes a number of accessed wireless local area network terminals, a number of wireless local area network terminals recently generating data traffic, a number of data frames, and a data frame length.

13. The method of claim 11, wherein the step of periodically monitoring the load states of the access points comprises the sub-steps of:
   periodically receiving load state information from the access points;
   detecting timed changing values of load values by using the load state information periodically received from the access points;
   transmitting a signal for requesting to transmit the load state information to access points whose timed changing values are more than a predetermined value, when the timed changing values of detected load values are more than the predetermined value;
   generating load state information messages, including the load state information, by the access points receiving the signal for requesting to transmit the load state information; and
   monitoring load states of the access points according to the load state information messages generated from the access points.

14. The method of claim 11, wherein the step of transmitting the load increase suppressing signal comprises the sub-steps of:
   (a) determining whether there are access points whose load values exceed the threshold value based on load state information received from multi-access points;
   (b) repeating the step of periodically monitoring the load states of the access points when it is determined, in sub-step (a), that there are no access points whose load values exceed the threshold value;
   (c) determining whether there are neighboring idle access points when it is determined, in sub-step (a), that there are access points whose load values exceed the threshold value;
   (d) repeating the step of periodically monitoring the load states of the access points when it is determined, in sub-step (c), that there are no neighboring idle access points; and
   (e) transmitting the load increase suppressing signal to the access points whose load values exceed the threshold value when it is determined, in sub-step (c), that there are neighboring idle access points.

15. The method of claim 11, wherein the step of suppressing the increase of the load comprises the sub-steps of deleting network node addresses of the wireless local area network terminals from basic service set tables, and intercepting access of the wireless local area network terminals when the wireless local area network terminals, which do not continuously generate data traffic and keep accessing according to a control signal for suppressing the increase of the load, generate data traffic.

16. The method of claim 11, wherein the transmitting of the authentication response failure message for the access-attempting wireless local area network terminals comprises the sub-steps of:
   transmitting information on the access-attempting wireless local area network terminals to neighboring idle access points; and
   attempting access to the wireless local area network terminals, and setting the access by the neighboring idle access points.

17. A method of controlling load balance of multi-access points in a wireless local area network system including a plurality of wireless local area network terminals and a plurality of access points, the method comprising the steps of:
   periodically monitoring load states of the access points;
   transmitting a load increase suppressing signal to access points whose load values exceed a threshold value when there are the access points whose load values exceed the threshold value and there are idle access points around the access points while monitoring the load states of the access points; and
   suppressing an increase of load by deleting network node addresses of the wireless local area network terminals from basic service set tables and intercepting access of the wireless local area network terminals when the wireless local area network terminals, which do not continuously generate data traffic and keep accessing according to a control signal for suppressing the increase of the load, generate data traffic in corresponding access points according to the transmitted load increase suppressing signal:
   wherein the step of suppressing the increase of load comprises the sub-steps of:

transmitting information on neighboring idle access points to the access points whose load values exceed the threshold value;

transmitting the information on the neighboring idle access points to the wireless local area network terminals by the access points; and attempting access to the neighboring idle access points, and setting the access by the wireless local area network terminals.

18. The method of claim 17, wherein the step of suppressing the increase of load further comprises the sub-steps of:

transmitting information on the wireless local area network terminals generating the data traffic to the idle access points around the access points whose load values exceed the threshold value; and attempting access to the wireless local area network terminals, and setting the access by the idle access points.

19. An apparatus, comprising:

a plurality of wireless network terminals having wireless network interfaces and receiving a wireless network service;

a plurality of access points for providing the wireless network service to the wireless network terminals, for periodically transmitting load state information, and for suppressing an increase of load when a load suppressing signal is received; and an evaluation unit for comparatively evaluating load states of each access point by receiving the load state information from the access points, and for transmitting a load increase suppressing signal to access points whose load values are more than a threshold value, when there are access points whose load values are more than the threshold value, and when other access points around the access points whose load values are more than the threshold value are in an idle state;

wherein, when transmitting an authentication failure message according to an authentication request of the wireless local area network terminals, the evaluation unit transmits information on other neighboring access points in the idle state to the access points whose load value exceed the threshold value, the access points transmit the information on the other neighboring access points in the idle state to the wireless local area network terminals, and the wireless local area network terminals receive the information on the other neighboring access points in the idle state from the access points and attempt access to the other access points in the idle state.

20. The apparatus of claim 19, wherein the load state information received by the evaluation unit from the access points includes a number of accessed wireless network terminals, a number of wireless network terminals recently generating data traffic, a number of data frames, and a data frame length.

21. The apparatus of claim 20, wherein a load increase suppressing operation, performed by the wireless network access points, includes transmitting an authentication failure message according to an authentication request of wireless network terminals attempting the access.

22. The apparatus of claim 21, wherein the load increase suppressing operation, performed by the wireless network access points, includes deleting network node addresses of the wireless network terminals by basic service set tables and intercepting the access of the wireless network terminals when wireless network terminals, which do not continuously generate data traffic and which keep accessing, generate the data traffic.

* * * * *